United States Patent
Park

(10) Patent No.: US 8,229,220 B2
(45) Date of Patent: Jul. 24, 2012

(54) IMAGE PROCESSING APPARATUS AND IMAGE PROCESSING METHOD

(75) Inventor: Eun-ok Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1386 days.

(21) Appl. No.: 11/774,065

(22) Filed: Jul. 6, 2007

(65) Prior Publication Data

US 2008/0013865 A1    Jan. 17, 2008

(30) Foreign Application Priority Data

Jul. 12, 2006   (KR) .................. 10-2006-0065557

(51) Int. Cl.
*G06K 9/34* (2006.01)
(52) U.S. Cl. ......... 382/173; 382/282; 382/307; 382/311
(58) Field of Classification Search ............... 382/173, 382/282, 307, 311; 345/619; 358/1.9, 2.1, 358/474
See application file for complete search history.

(56) References Cited

U.S. PATENT DOCUMENTS

| | | | |
|---|---|---|---|
| 6,903,751 B2 * | 6/2005 | Saund et al. | 345/619 |
| 7,605,944 B2 * | 10/2009 | Chung | 358/1.9 |
| 2003/0043399 A1 | 3/2003 | Johnston et al. | |
| 2003/0044086 A1 | 3/2003 | Jia et al. | |
| 2004/0130736 A1 | 7/2004 | Lee | |
| 2004/0169873 A1 | 9/2004 | Nagarajan | |
| 2005/0254859 A1 | 11/2005 | Kim et al. | |

FOREIGN PATENT DOCUMENTS

| | | |
|---|---|---|
| JP | 2000-113181 | 4/2000 |
| KR | 20050108559 | 11/2005 |
| KR | 20060064288 | 6/2006 |

OTHER PUBLICATIONS

Korean Notice of Allowance issued Nov. 30, 2009 in KR Application No. 2006-0065557.

\* cited by examiner

*Primary Examiner* — Anh Hong Do

(74) *Attorney, Agent, or Firm* — Stanzione & Kim, LLP

(57) ABSTRACT

An image processing apparatus and method which revises a certain region of a scanned image to meet a user demand. The image processing method includes displaying a scanned image by scanning an scanning object, selecting a plurality of regions of the displayed scanned image, setting an image process to be performed on the selected regions and generating a final image by performing the set image process on the selected regions.

25 Claims, 4 Drawing Sheets

IMAGE PROCESSING APPARATUS AND IMAGE PROCESSING METHOD

CROSS-REFERENCE TO RELATED APPLICATIONS

This application claims the benefit of Korean Patent Application No. 2006-0065557, filed on Jul. 12, 2006, in the Korean Intellectual Property Office, the disclosure of which is incorporated herein by reference in its entirety.

BACKGROUND OF THE INVENTION

1. Field of the Invention

The present general inventive concept relates to an image processing apparatus and an image processing method. More particularly, the present general inventive concept relates to an image processing apparatus which revises a certain region of a scanned image to meet a user's demand, and an image processing method that performs the same.

2. Description of the Related Art

An image processing apparatus, such as a computer system, serves as a host to a scanner and a multi-function device (hereinafter, to be referred to as a "scanning device"), and controls an operation of the scanning device according to a user's command. More specifically, the image processing apparatus scans a scanning object such as pictures and texts to receive an image (hereinafter, to be called a "scanned image"), and generates a final output image (hereinafter, to be called a "final image") by performing a predetermined image process on the scanned image.

When a user desires to generate the final image according to his/her demand, the image processing apparatus performs the image process on the scanned image according to a user's demand. Typically, the conventional image processing apparatus performs the image process on the overall scanned image.

The scanning object sometimes has a plurality of images with different characters, like pictures and texts. In this case, a user may want the pictures to be milder while the text to be clearer.

The conventional image processing apparatus performs the image process on the overall scanned image. Thus, the conventional image processing apparatus cannot process the image corresponding to respective parts thereof according to a user's demand.

Even if the image is a single image, a user may want a certain part thereof to be revised. However, the conventional image processing apparatus does not provide such a function.

The conventional image processing apparatus cannot revise a certain image or a certain region of a scanned image according to a user's demand, thereby failing to meet such a demand.

When public offices or banks store and manage scanned images of ID cards, they may pixelate a part of people's faces or ID numbers of the scanned image. This work may be repeatedly done. In this case, a user should repeat the same scan setting operation for each image, causing inconvenience and inefficiency.

SUMMARY OF THE INVENTION

Accordingly, the present general inventive concept provides an image processing apparatus which revises a certain region of a scanned image and meets a user's demand, and an image processing method that performs the same.

The present general inventive concept also provides an image processing apparatus which does not require a user's command on a same operation while scanning and processing images repeatedly and improves a user's convenience, and an image processing method that performs the same.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing an image processing method, comprising: displaying a scanned image by scanning a scanning object; selecting a plurality of regions of the displayed scanned image; setting an image process to be performed on the selected regions; and generating a final image by performing the set image process on the selected regions.

The selecting the respective regions may comprise displaying a selection box on the displayed scanned image.

The position or size of the selection box is adjustable.

The selection box can be selected and cancelled.

The image processing method may further comprise: removing the selection box when the selection of the selected regions is cancelled.

The image processing method may further comprise: restoring the image process performed on the selected regions when the selection of the selected regions is cancelled.

The generating the final image may comprise: determining coordinate values of the selected regions of the scanned image; determining start indexes and end indexes of the selected regions based on the determined coordinate values; extracting data between the start and end indexes from data of the scanned image; performing the determined image processes to the extracted data; and combining the data performed with the image process and the data of the scanned image.

The image processing method may further comprise: storing information on at least one of the selected regions and the determined image process.

The foregoing and/or other aspects and utilities of the present general inventive concept are also achieved by providing an image processing apparatus, comprising: a display part; an image processor which performs a predetermined image process on a scanned image generated by scanning a scanning object; and a controller which displays the generated scanned image on the display part, selects a plurality of regions of the displayed scanned image, determines an image process to be performed on the selected regions and controls the image processor to generate a final image by performing the determined image processes on the selected regions.

The image processing apparatus may further comprise: a user interface (UI) processor which displays a selection box on the displayed scanned image according to a control of the controller.

The controller can control the UI processor to adjust a position or a size of the selection box.

The controller can control the UI processor to select the selection box or to cancel the selection of the selection box.

The controller can control the UI processor to remove the selection box when the selection of the selected region is cancelled.

The controller can control the image processor to restore the image process performed on the selected regions when the selection of the selected region is cancelled.

The controller can determine coordinates values of the selected regions of the scanned image, determine start indexes and end indexes of the selected regions based on the determined coordinate values, extract data between the start and end indexes from data of the scanned image and control the image processor to perform the determined image processes on the extracted data and to combine the data performed with the image process and the data of the scanned image.

The image processing apparatus may further comprise: a storage part which stores information on at least one of the selected regions and the determined image process.

The foregoing and/or other aspects and utilities of the present general inventive concept are also achieved by providing an image processing method, comprising: selecting certain regions of a scanned image with a user command; and generating a final image by performing predetermined image processes on the selected regions.

The image processes performed on the selected regions can be performed according to a user command.

The generating a final image can be performed by combining the processed images of the selected regions with the original scanned image.

The foregoing and/or other aspects and utilities of the present general inventive concept are also achieved by providing an image processing apparatus to process a scanned image, comprising: a user input part to receive a user command on a scanning operation; a storage part to store operation data to drive the image processing apparatus and to store result data from the operations of the image processing apparatus; and a controller to transmit a scanning command to a scanning device according to the user command received through the user input part, to control a user interface (UI) processor to display a user interface including the scanned image, selection boxes on the scanned image to select regions of the scanned image to be processed, and items to set a scanning operation to be performed on the selected regions, and to control the image processing apparatus to perform image processes on the selected regions of the scanned image according to the received user command.

The user command on a scanning operation includes performing predetermined image processes on a scanned image.

The controller can control the UI processor to adjust a position and/or size of the selection boxes according to a user command received through the user input part.

The controller can determine coordinate values of the selected regions of the scanned image to perform the image processes, and determines start indexes and end indexes of the selected regions based on the coordinate values.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
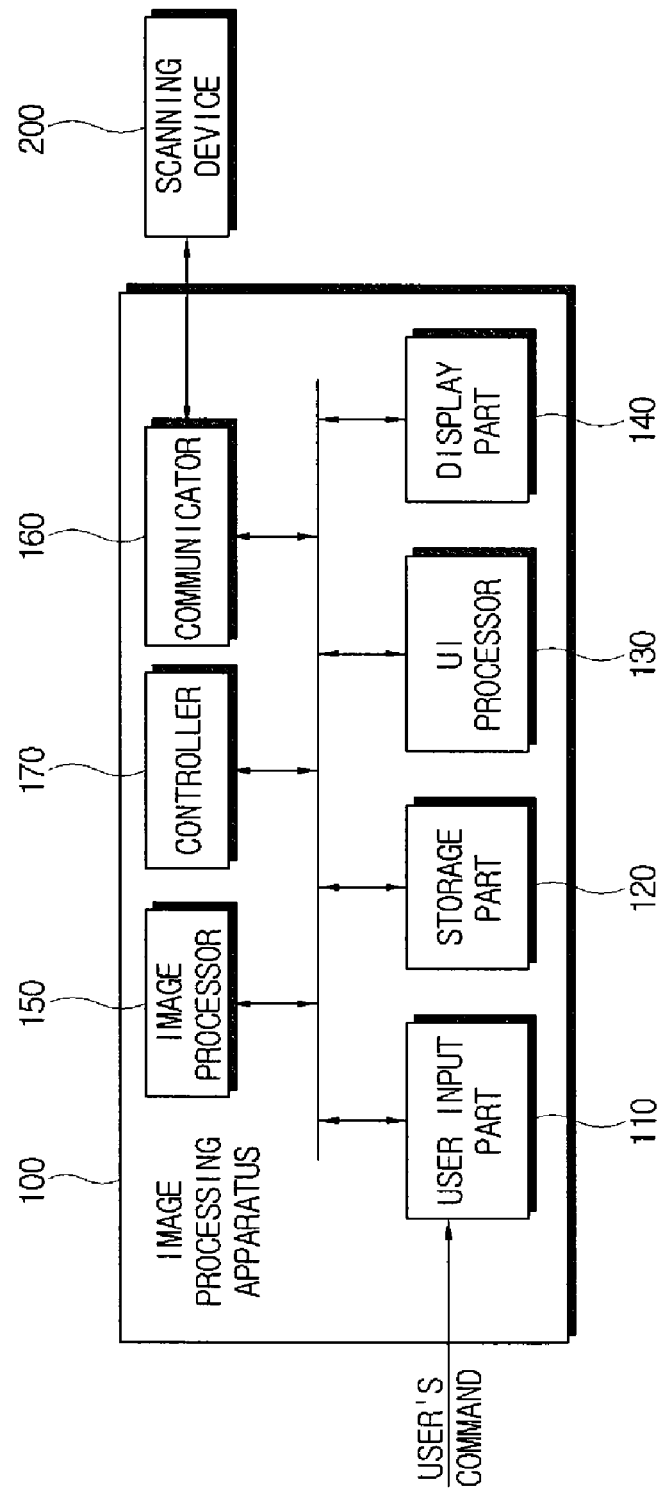
FIG. 1 is a control block diagram of an image processing apparatus according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Referring to FIG. 1, an image processing apparatus 100 may comprise a computer system which serves as a host to a scanning device 200. The image processing apparatus 100 controls an operation of the scanning device 200 according to a user command. More specifically, the image processing apparatus 100 can scan a scanable object having pictures and/or text to receive a scanned image, and can generate a final image by performing a predetermined image process on the scanned image.

Particularly, the image processing apparatus 100 according to the present embodiment can select a certain region of the scanned image according to a user command and can generate a final image by performing the predetermined image process on the selected region. The image processing apparatus 100 determines an image process to be performed on the selected region, according to a user command.

As illustrated in FIG. 1, the image processing apparatus 100 can comprise a user input part 110, a storage part 120, a user interface (UI) processor 130, a display part 140, an image processor 150, a communicator 160 and a controller 170. The user input part 110 can receive a user command related to a scanning operation and can transmit it to the controller 170. The user input part 110 may comprise a keyboard, a mouse, etc. The storage part 120 can store operation data to drive the image processing apparatus 100 and result data from operations of the image processing apparatus 100 therein.

The UI processor 130 can generate a user interface (UI) 10 (refer to FIG. 2) to be displayed on the display part 140 under control of the controller 170. The UI 10 according to the present embodiment can comprise a scanned image 12 and selection boxes 121a and 121b displayed on the scanned image 12, as well as items 11 to set a scanning operation. The positions and sizes of the selection boxes 121a and 121b are adjusted by a user manipulation through the user input part 110. The UI 10 may further comprise selection box cancellation icons 122a and 122b to cancel the selection of regions in the selection boxes 121a and 121b, i.e., to remove the selection boxes 121a and 121b.

The display part 140 can display the UI 10 generated by the UI processor 130. The display part 140 may comprise, for example, a cathode ray tube (CRT) monitor or a liquid crystal display (LCD) monitor. The image processor 150 performs the predetermined image process on the scanned image according to the control of the controller 170 and generates the final image. The communicator 140 can communicate with the scanning device 200 according to the control of the controller 170. The communicator 140 may comprise a network card.

Figure 2:
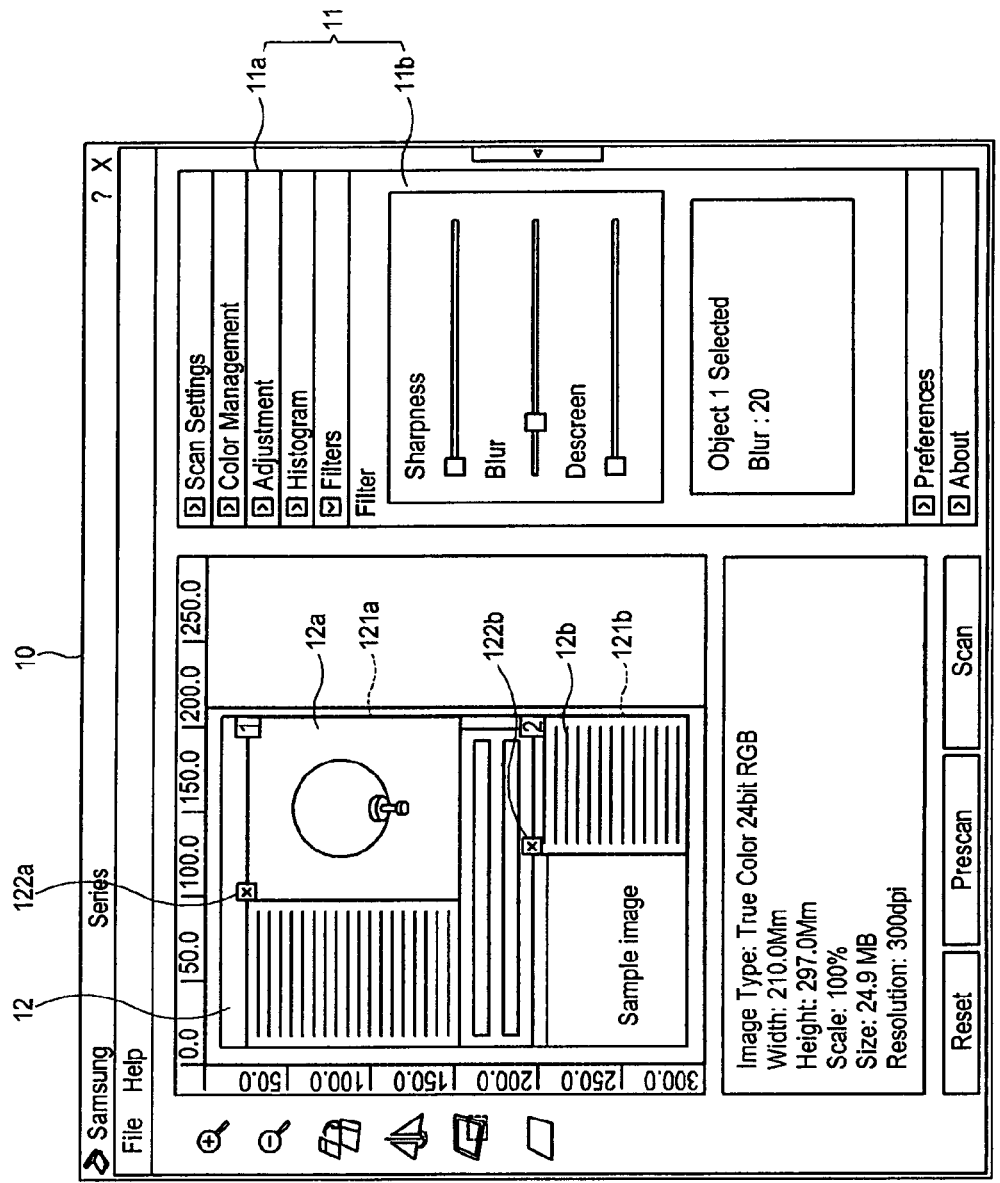
FIG. 2 illustrates a user interface (UI) according to the embodiment of the present general inventive concept.

The controller 170 controls the image processing apparatus 100 in general. The controller 170 transmits a scanning command to the scanning device 200 according to a user command. As illustrated in FIG. 2, the controller 170 controls the UI processor 130 to display the UI 10 when receiving the scanned image from the scanning device 200.

The controller 170 selects at least one region 12a and 12b of the scanned image 12 displayed on the UI 10, according to a user command. In the present embodiment, the inside part of the selection boxes 121a and 121b displayed on the scanned image 12 becomes the user selected regions 12a and 12b. The controller 170 controls the UI processor 130 to adjust the position or size of the selection boxes 121a and 121b according to a user command through the user input part 110.

Also, the controller 170 determines the image process to be performed on the selected regions 12a and 12b, according to a user command. The image process according to the present embodiment can comprise an image process such as sharpness, blur, etc. A user may adjust the image process to be performed on the selected regions 12a and 12b through an adjustment item 11b to process the image. In this case, a user may adjust separate image processes for the respective regions 12a and 12b of the two selection boxes 121a and 121b.

The controller 170 can control the image processor 150 to perform the determined image processes on the selected regions 12a and 12b and to generate the final image. The image process can be performed on the regions 12a and 12b of the selection boxes 121a and 121b. In a case when the selection of the regions 12a and 12b is cancelled, the controller 170 may control the image processor 150 to restore the image process performed on the selected regions 12a and 12b.

The controller 170 determines coordinate values of the selected regions 12a and 12b of the scanned image 12, to perform the image process. The coordinate values may be represented two dimensions (x, y). In the present embodiment, coordinate values of corners of the selection boxes 121a and 121b may be used.

Figure 3:
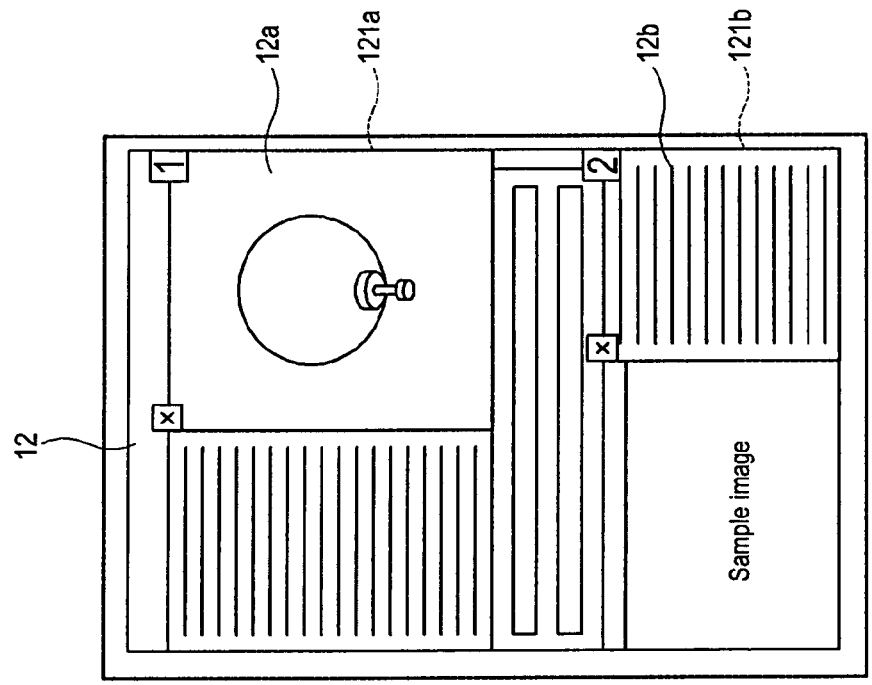
FIG. 3 illustrates a start index and an end index according to the embodiment of the present general inventive concept.

The controller 170 determines start indexes and end indexes of the selected regions 12a and 12b based on the determined coordinate values. As illustrated in FIG. 3, the start index(s) and end index(s) according to the present embodiment respectively point to a start portion and an end portion of concerned data (for example a data 123a or another data 123b) of the scanned image 123 corresponding to the selected regions 12a and 12b.

The controller 170 extracts the data 123a and 123b of the start and end indexes from the data 123 of the scanned image 12. The controller 170 controls the image processor 150 to perform the determined image process on the extracted data 123a and 123b and to combine the data performed with the image process and the data 122 of the original scanned image 12. The data 123 of the scanned image 12 may be stored in the storage part 120.

The controller 170 may store at least one of information on the selected regions 12a and 12b and the determined image process, in the storage part 120. In this case, the controller 170 controls the image processor 150 to generate the final image based on the information stored in the storage part 120.

As an exemplary application of the present embodiment, public offices or banks may pixelate a part of a human face or a part of an ID number among the scanned image of an ID card to store and manage the partly pixilated processed image of the ID card. In this case, according to an embodiment of the present general inventive concept, a user may select regions corresponding to the part of the face and the ID number and determine the image processes (i.e., pixelating, covering, etc.) of the parts different from each other. The storage part 120 may store information on the regions corresponding to the face part and the ID number part and on the image process or processes performed on the region.

Thus, the image processing apparatus 100 according to the present embodiment may perform the same image processes on scanned images of other ID cards based on the same information of the stored region and image process. Since a user's repetitive commands are not required for the same operation of scanning and image processing, user convenience is improved.

The controller 170 according to the present embodiment may be realized as a computer program. In this case, the controller 170 may comprise a memory such as a read only memory (ROM) (not illustrated) to store the computer program therein, and a central processing unit (CPU) (not illustrated) and a random access memory (RAM) (not illustrated) to execute the computer program.

Figure 4:
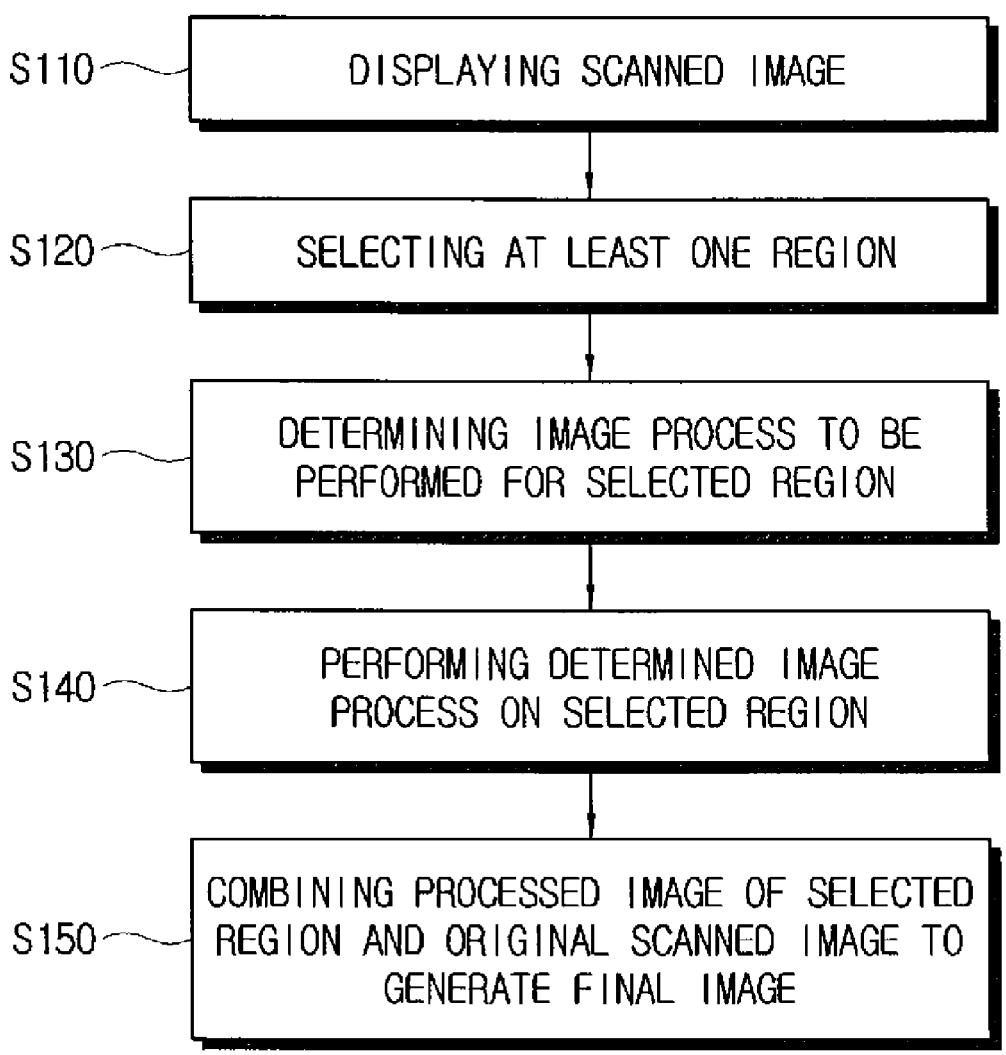
FIG. 4 is a control flowchart of an image processing method according to the embodiment of the present general inventive concept.

FIG. 4 is a control flowchart of an image processing method according to an embodiment of the present general inventive concept. Referring to FIG. 4, first a predetermined object to be scanned is scanned to display a scanned image (operation S110). At least one region of the displayed scanned image is then selected (operation S120). The region of the scanned image can be selected by a user command.

The image processes to be performed for the selected regions are determined in operation S130. The image process can also be determined by a user command. The selected regions are performed with the determined image process (operation S140). The region performed with the image process is combined with the original scanned image to generate a final image (operation S150).

As described above, embodiments of the present general inventive concept provide an image processing apparatus which revises (processes) a certain region of a scanned image to meet a user demand, and an image processing method.

Also, the present general inventive concept provides an image processing apparatus which does not require a user command on a same operation to perform repetitive scanning and image processes, and an image processing method.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image processing method, comprising:
    displaying, by a display part of an image processing apparatus, a scanned image by scanning a scanning object;
    selecting, by a controller of the image processing apparatus, a plurality of regions of the displayed scanned image;
    setting, by the controller, an image process to be performed on the selected regions; and
    generating, by an image processor of the image processing apparatus, a final image by performing the set image process on the selected regions,
    the final image including a non-selected region of the scanned image and the selected regions on which the set image process is performed.

2. The image processing method according to claim 1, wherein the selecting the respective regions comprises displaying a selection box on the displayed scanned image.

3. The image processing method according to claim 2, wherein the position or size of the selection box is adjustable.

4. The image processing method according to claim 2, wherein the selection box is selectable and cancelable.

5. The image processing method according to claim 2, further comprising:
    removing, by a user interface processor of the image processing apparatus, the selection box when the selection of the selected regions is cancelled.

6. The image processing method according to claim 2, further comprising:

restoring, by the image processor, the image process performed on the selected regions when the selection of the selected regions is cancelled.

7. The image processing method according to claim 1, wherein the generating the final image comprises:
determining, by the controller, coordinate values of the selected regions of the scanned image;
determining, by the controller, start indexes and end indexes of the selected regions based on the determined coordinate values;
extracting, by the controller, data between the start and end indexes from data of the scanned image;
performing, by the image processor, the determined image processes on the extracted data; and
combining, by the image processor, the data performed with the image processes and the data of the scanned image.

8. The image processing method according to claim 1, further comprising:
storing, by a storage part of the image processing apparatus, information on at least one of the selected regions and the determined image process.

9. An image processing apparatus, comprising:
a display part;
an image processor which performs predetermined image processes on a scanned image generated by scanning a scanning object; and
a controller which displays the generated scanned image on the display part, selects a plurality of regions of the displayed scanned image, determines image processes to be performed on the selected regions and controls the image processor to generate a final image by performing the determined image processes on the selected regions,
wherein the final image includes a non-selected region of the scanned image and the selected regions on which the determined image processes are performed.

10. The image processing apparatus according to claim 9, further comprising:
a user interface (UI) processor which displays a selection box on the displayed scanned image according to a control of the controller.

11. The image processing apparatus according to claim 10, wherein the controller controls the UI processor to adjust a position or a size of the selection box.

12. The image processing apparatus according to claim 10, wherein the controller controls the UI processor to select the selection box or to cancel the selection of the selection box.

13. The image processing apparatus according to claim 10, wherein the controller controls the UI processor to remove the selection box when the selection of the selected region is cancelled.

14. The image processing apparatus according to claim 10, wherein the controller controls the image processor to restore the image process performed on the selected regions when the selection of the selected region is cancelled.

15. The image processing apparatus according to claim 9, wherein the controller determines coordinates values of the selected regions of the scanned image, determines start indexes and end indexes of the selected regions based on the determined coordinate values, extracts data between the start and end indexes from data of the scanned image and controls the image processor to perform the determined image processes on the extracted data and to combine the data performed with the image process and the data of the scanned image.

16. The image processing apparatus according to claim 9, further comprising:
a storage part which stores information on at least one of the selected regions and the determined image process.

17. An image processing method, comprising:
selecting, by a controller of an image processing apparatus, certain regions of a scanned image with a user command; and
generating, by an image processor of the image processing apparatus, a final image by performing predetermined image processes on the selected regions,
the final image including a non-selected region of the scanned image and the selected regions on which the predetermined image processes are performed.

18. The image processing method according to claim 17, wherein the image processes performed on the selected regions are performed according to a user command.

19. The image processing method according to claim 17, wherein the generating a final image is performed by combining the processed images of the selected regions with the original scanned image.

20. An image processing apparatus to process a scanned image, comprising:
a user input part to receive a user command on a scanning operation;
a storage part to store operation data to drive the image processing apparatus and to store result data from the operations of the image processing apparatus; and
a controller to transmit a scanning command to a scanning device according to the user command received through the user input part, to control a user interface (UI) processor to display a user interface including the scanned image, selection boxes on the scanned image to select regions of the scanned image to be processed, and items to set a scanning operation to be performed on the selected regions, and to control the image processing apparatus to perform image processes on the selected regions of the scanned image according to the received user command.

21. The image processing method according to claim 17, wherein an image process performed on at least one of the selected regions is different from an image process performed on other selected regions.

22. The image processing method according to claim 17, wherein the selected regions and the predetermined image processes are determined based on stored information that includes information about locations of the selected regions and the image processes for the selected region.

23. The image processing method according to claim 17, further comprising:
storing, by a storage part of the image processing apparatus, information about location of the selected regions and the image processes performed for the selected region.

24. The image processing method according to claim 17, wherein the performing of the image processes includes performing at least one of blurring, sharpening, pixelating, and covering.

25. An image processing method, comprising:
displaying, by a display part of an image processing apparatus, a scanned image generated based on a scanned object;
selecting, by a controller of the image processing apparatus, at least one region of the scanned image;
selecting, by the controller, an image process to be performed on the at least one region; and
generating, by an image processor of the image processing apparatus, a final image by performing the image process on the at least one selected region and combining the processed at least one image with non-selected regions of the scanned image.

* * * * *